(12) United States Patent
Hirdina

(10) Patent No.: US 9,085,099 B2
(45) Date of Patent: Jul. 21, 2015

(54) STRETCH BLOW MOULDING MACHINE AND METHOD

(71) Applicant: KRONES AG, Regensburg (DE)

(72) Inventor: Jochen Hirdina, Regensburg (DE)

(73) Assignee: KRONES, AG, Neutraubling (DE)

( * ) Notice: Subject to any disclaimer, the term of this patent is extended or adjusted under 35 U.S.C. 154(b) by 0 days.

(21) Appl. No.: 14/082,488

(22) Filed: Nov. 18, 2013

(65) Prior Publication Data

US 2014/0145379 A1    May 29, 2014

(30) Foreign Application Priority Data

Nov. 23, 2012 (DE) .......................... 10 2012 111 348

(51) Int. Cl.
 *B29C 49/12* (2006.01)
 *B29C 49/06* (2006.01)
 *B29C 49/36* (2006.01)
 *B29C 49/46* (2006.01)

(52) U.S. Cl.
 CPC ............... *B29C 49/12* (2013.01); *B29C 49/06* (2013.01); *B29C 49/36* (2013.01); *B29C 2049/1219* (2013.01); *B29C 2049/1257* (2013.01); *B29C 2049/4697* (2013.01); *B29C 2791/006* (2013.01); *B29C 2791/007* (2013.01)

(58) Field of Classification Search
 USPC .......................................................... 264/532
 See application file for complete search history.

(56) References Cited

U.S. PATENT DOCUMENTS

| 4,880,593 | A | * | 11/1989 | Strassheimer | ................ | 264/532 |
| 2005/0140036 | A1 | | 6/2005 | Hirota et al. | | |
| 2012/0248660 | A1 | * | 10/2012 | Beuerle et al. | ................ | 264/530 |

* cited by examiner

*Primary Examiner* — Jacob Thomas Minskey
(74) *Attorney, Agent, or Firm* — Onello & Mello, LLP.

(57) ABSTRACT

A stretch blow molding machine and method are provided for forming a container. A preform is expanded to a first configuration in a blow mold of a stretch blow molding machine. A stretching rod element is introduced to the blow mold to expand the preform from the first configuration to a second configuration. The stretching rod element moves axially in the blow mold in a stretching direction. The plastic perform is temporarily coupled to the stretching rod element during at least a period of time of the expansion of the preform from the first configuration to the second configuration for influencing a behavior of the perform during the expansion.

11 Claims, 2 Drawing Sheets

STRETCH BLOW MOULDING MACHINE AND METHOD

RELATED APPLICATIONS

This application claims priority to German patent application number 10-2012-111348.3 filed Nov. 23, 2012, the entire content of which is incorporated herein by reference, in its entirety.

BACKGROUND

Embodiments of the present inventive concepts relates to an apparatus and method of stretch blow moulding, in particular, for stretch blow moulding a plastic preform to form a container. The plastic preform is expanded in a blow mould of a stretch blow moulding machine to form the container. The plastic preform is stretched with the aid of a stretching rod element which can be moved axially into the blow mould in a stretching direction.

Embodiments of the present inventive concepts relate to a stretch blow moulding machine for stretch blow moulding a plastic preform to form a container, in particular, for carrying out the present method of stretch blow moulding, with at least one blow station comprising a blow mould. The at least on blow station can also comprise a stretching rod element that stretches the plastic preform in a stretching direction.

Generic methods of stretch blow moulding are sufficiently known with respect to the prior art. For example, any type of plastic containers can be produced according to a two-stage method of stretch blow moulding from generally rotationally symmetrical plastic preforms, by expanding these preforms by means of process air in a blow mould of a stretch blow moulding machine to form the plastic containers. Before they are expanded, these plastic preforms are generally heated to a defined process temperature in order to, with a corresponding shaping temperature, facilitate a targeted shaping process during stretch blow moulding.

The shaping temperature is of great significance in the prior art. According to the prior art, with the aid of IR radiation or other radiation sources, the plastic preform is provided with a temperature profile. The temperature profile is usually uniformly distributed about the circumference and it varies as a function of the process merely in the longitudinal direction of the plastic preform. After the plastic preform has been appropriately heated, this is followed by the actual shaping process in which the plastic preform is expanded by means of compressed air in particular in a stretch blow moulding process to form the particular plastic container.

A significant characteristic of a conventional plastic preform may be seen in the fact that it consists of a mouthpiece region already produced to final dimensions and an adjoining body region which is still to be deformed. The material to be processed in this case, generally including polyethylene terephthalate (PET), is also characterized in particular by the fact that during expanding or respectively elongating it tends towards self-hardening, or strain hardening. This effect is traditionally used specifically in the production of such plastic containers in order to optimise the wall thickness distribution of the particular plastic container.

In particular, a warmer material region is stretched and deformed until a stretching resistance resulting from the self-hardening is greater than a stretching resistance of an adjacent colder material region. The expansion of a plastic preform tip region, which is remote from the mouthpiece region, and which substantially forms the later base region of the plastic container, is more problematic since substantially less deformation or respectively expansion of the plastic preform occurs in this manner.

Disadvantageously, only very little material can be stretched out of the centre of the tip region. The resulting negative consequences include in particular a thick material area in this center. Thus, disadvantageously, this thick material area does not contain used material, which necessitates an increased cooling requirement, so that a desired stability of shape can be achieved. In the prior art, a mechanism is provided in the base of the blow mould in order to reduce or respectively to avoid the risks of formation of such a thick material area. However the construction of this mechanism is relatively complex.

SUMMARY

An object of the present inventive concepts is to provide a device, system, and/or method, whereby thick material areas of a container under formation can be stretched more easily using structural and process engineering techniques.

The object of the inventive concepts is achieved by a method of stretch blow moulding for stretch blow moulding of a plastic preform to form a container. The plastic preform is expanded in a blow mould of a stretch blow moulding machine to form the container. The plastic preform is additionally stretched with the aid of a stretching rod element which can be moved axially into the blow mould in the stretching direction. The plastic preform is fixed during its expansion at least in some regions, and, at least at times, on the stretching rod element in order to influence the expansion behavior or other configuration or shape-changing behavior of the plastic preform.

The stretching rod element or respectively the stretching rod must fix or respectively draw the plastic perform, not necessarily for the entire time or respectively during the entire expansion process. It would even be conceivable that the stretching rod draws the plastic preform only at the start of the expansion and then in a manner which is known per se moves together with the preform in the direction of the base mould.

The plastic preform is preferably drawn by the stretching rod element and thus fixed thereon. However, another type of fixing is possible, for instance, an approach that includes fixing the plastic preform between the end of the stretching rod and a region of the blow mould, for instance, a region of the base mould which is constructed as a projection which extends in the direction of the plastic preform. In this case, it is possible that the plastic preform or, ore specifically, an area around an injection point, is gripped between the stretching rod and this projection. Thus, for example, a spring-loaded projection, which moves back again into the base mould under the force of the stretching rod during the expansion process, can be disposed in the base mould. The tip region or respectively the region around the injection point of the plastic preform can be gripped between this spring-loaded extension and the stretching rod during the expansion process. Advantageously, at least a region of the plastic perform, which completely contains an injection point of the plastic perform, is fixed on the stretching rod element.

Thus, according to embodiments of the present inventive concepts, the plastic preform is disposed, preferably in a vacuum-fixed manner, on the stretching rod element while it is being shaped to form the container. At or near the same time, this plastic preform is expanded by a blowing pressure. Advantageously the stretching rod element can be introduced into the plastic preform.

It is known from the prior art, for example, from the document DE 10 2005 05 74 65 A1, the entire content of which is incorporated herein by reference, to transfer a plastic preform between two processing stations by a stretching rod and a vacuum. However, this relates to a time before the actual stretch blow moulding process and there is no association here with being able to advantageously modulate material stretching on the plastic preform during the stretch blow moulding process, for example, in accordance with an embodiment of the present inventive concepts.

During its expansion, while it is being shaped to form the container inside the blow mould, the plastic preform is simultaneously drawn on by the stretching rod element, in particular, by negative pressure, at least in some areas. Thus, it can be fixed on the stretching rod element. Accordingly, the material can be much better distributed on critical areas of the plastic preform without additional structural components of the blow mould. In some embodiments, the tip region of the plastic preform belongs to such a critical area.

In addition to overcoming the disadvantages already mentioned above, it is also possible to economize on material for producing the containers due to the better distribution or respectively stretching of the material overall. As a result, finished containers can be constructed to be lighter in weight as compared to conventional containers.

Advantageously, during the fixing or respectively drawing onto the stretching rod element the plastic preform is further expanded to form the container. Since, because of the resulting thinner base region on this container, it is possible to reduce the cooling requirement of the base region to be cooled, the output capacity of a blow moulding machine can be substantially increased. Moreover, by reducing the cooling requirement, the energy consumption can be reduced. With regard to the enormously large number of containers to be produced in this connection, this feature is advantageous with respect to energy consumption.

Furthermore, the present inventive concepts simplifies the production of lightweight containers, and, in particular, panel-free hot-fill bottles for hot-filling because of a hitherto unknown base geometry which can be moulded flexibly.

During the expansion at least one material region of the plastic preform can be drawn at an opening of the stretching rod element. In this manner, it can be fixed on the stretching rod element in such a way that a stretching behavior of the plastic preform at the drawn-on material region is influenced during the expansion. This fixing or respectively drawing on during the process of shaping the plastic preform to form the container can take place either continuously or temporarily.

The fixing or respectively drawing-on time can be set to be different from a stretch blow moulding time, so that the drawing-on time does not amount to the total expansion or respectively shaping phase of the plastic preform.

The stretching rod element can interact pneumatically with different material regions of the plastic preform in order to fix the plastic preform in some regions by the negative pressure. However, advantageous stretching of material of the plastic preform may be achieved if during its expansion the plastic preform is fixed or respectively drawn on, with the aid of the stretching rod element, at the material region of the plastic preform opposite the mouthpiece region, in particular, its tip region.

The tip region encompasses the injection point of the plastic preform, on which material accumulates due to manufacturing tolerances during production or respectively during injection moulding of the plastic preform. In conventional situations, the material accumulated in particular in this tip region could not be stretched out at all or only insufficiently or respectively only with considerable construction costs from outside the plastic preform.

In accordance with embodiments of the present inventive concepts, with respect to the process engineering but extremely simply, and also with low construction costs, accumulations of material due to manufacturing tolerances are advantageously stretched during the shaping of the plastic preform to form a container. Furthermore, due to the drawing on of the plastic preform in the tip region, an outstanding vacuum centring of the plastic preform tip region is achieved during the stretch blow moulding.

It is advantageous that, during the drawing on of the plastic preform by the stretching rod element, a material region drawn on by the stretching rod element and/or adjacent material regions are simultaneously stretched. In this manner, the material region to be stretched can be determined and targeted relatively precisely. Moreover, the diversity of methods for transforming the plastic preform to form the particular container is advantageously extended.

A preferred variant of the method in accordance with some embodiments provides that at least these neighbouring material regions are further expanded axially in the stretching direction if the plastic preform is fixed on the stretching rod element, in particular, by the application of a vacuum, so that the tip region of the plastic preform can be outstandingly tapered and an accumulation of material can be advantageously stretched.

Accordingly, there are many variants of methods with regard to the present inventive concepts that include a method of stretch blow moulding. Some embodiment provides in particular that the stretching rod element for stretching the plastic preform is displaced by a displacement path which can be chosen freely in the stretching direction into a holding position and is held temporarily in this holding position for a time period which can be chosen freely, while in this holding position the plastic preform fixed or respectively drawn on by the stretching rod element is further expanded axially and/or radially. This provides for an extraordinarily high number of transforming variants with regard to the method of stretch blow moulding in which plastic preforms are transformed into containers. Following the abovementioned time period during which the stretching rod can be held in its holding position, this advantageously moves in a known manner in the direction of the preform tip in order to stretch the preform.

In some embodiments, stretch blow moulding is achieved simply if, inside the plastic preform a blow pressure for expanding the plastic preform and, in particular within of the stretching rod element, a negative pressure for drawing on the plastic preform are provided simultaneously at least at times.

In this respect a blow pressure for expanding the plastic preform and a negative pressure for drawing on the plastic preform are simultaneously provided spatially within a blow mould cavity in which the stretching rod element is moved.

An object of the present inventive concepts can be achieved by a stretch blow moulding machine for stretch blow moulding of a plastic preform to form a container, in particular, for carrying out a method of stretch blow moulding according to the inventive features described here, with at least one blow station comprising a blow mould, in which the at least one blow station comprises a stretching rod element for stretching the plastic preform in the stretching direction. The stretch blow moulding machine comprises a vacuum generating device where a vacuum can be generated during the stretch blow moulding of the plastic preform to form the container within the stretching rod element.

According to embodiments of the present inventive concepts, a vacuum generating device is connected to a blow pressure generating device of the stretch blow moulding machine in such a way that during the stretch blow moulding a vacuum can be generated within the stretching rod element.

In some embodiments, the at least one blow station of the stretch blow moulding machine has a stretching rod element with a sealing lip element disposed at the end of its hollow rod body facing the plastic preform for pneumatic sealing of the stretching rod element with respect to the plastic preform. Thus, the plastic preform can be reliably drawn.

Stretch blow moulding machines already in operation can advantageously be retrofitted with this stretching rod element in a structurally simple manner in order to be able to carry out the method according to embodiments of the present inventive concepts. The sealing lip element advantageously surrounds a vacuum opening of a negative pressure region of the stretching rod element and seals this vacuum opening with respect to the surrounding blowing pressure region.

In order to be able to achieve good pneumatic sealing between the stretching rod element and the plastic preform, the material of the sealing lip element can be of such a shape that the outer configuration thereof can be adapted dynamically and without problems to the shape of the plastic preform which changes due to the expansion process. The sealing lip element is advantageously of an elastic construction.

Alternatively, the stretching rod element can have an overpressure region for providing a blow pressure within the plastic preform and a negative pressure region pneumatically separated from this overpressure region for drawing in the plastic preform. Thus, the at least one blow station of the stretch blow moulding machine can alternatively have a stretching rod element with pressure regions spatially and pneumatically separated from one another.

However, this blow pressure can be provided in a known manner, for example, by a conventional nozzle element and/or supplied to the plastic perform, in particular, in the region between the stretching rod and the mouth.

The stretch blow moulding machine permits a stretching of accumulations of material on plastic preforms in material regions can be carried out in a structurally simple manner, as distinguished from conventional machines, which could only be very treated by very expensive technical means.

In an aspect, a method of forming a container, comprises expanding a preform to a first configuration in a blow mould of a stretch blow moulding machine; introducing a stretching rod element to the blow mould to expand the preform from the first configuration to a second configuration; and moving the stretching rod element axially in the blow mould in a stretching direction. The plastic perform is temporarily coupled to the stretching rod element during at least a period of time of the expansion of the preform from the first configuration to the second configuration for influencing a behavior of the perform during the expansion.

In some embodiments, the preform is drawn by the stretching rod element.

In some embodiments, the preform is drawn by the stretching rod at a tip region of a material region opposite a mouthpiece region.

In some embodiments, during the drawing of the preform by the stretching rod element, at least one of a material region drawn by the stretching rod element or adjacent material regions are stretched.

In some embodiments, the at least one of the material region drawn by the stretching rod element or adjacent material regions are expanded further axially in the stretching direction in response to the preform being temporarily coupled to the stretching rod element by a vacuum.

In some embodiments, the method further comprises moving the stretching rod element along a displacement path in the stretching direction to a holding position; temporarily positioning the stretching rod element in the holding position for a predetermined time period; and in the holding position, expanding the perform at least one of axially or radially.

In some embodiments, a time during which the preform is set differently then a stretch blow moulding time.

In some embodiments, the method further comprises simultaneously providing a blow pressure for expanding the preform and a negative pressure for drawing on the perform.

In some embodiments, the perform comprises a plastic material.

In another aspect, a stretch blow moulding machine comprises at least one blow station comprising a blow mould and a stretching rod element for stretching a preform in a stretching direction; and a vacuum generating device that generates a vacuum at the stretching rod element during a stretch blow moulding operation performed on the preform to form a container.

In some embodiments, the stretching rod element includes a hollow rod body and a sealing lip element at the end of the hollow rod body, the sealing lip element positioned to pneumatic seal the stretching rod element with respect to the preform.

BRIEF DESCRIPTION OF THE DRAWINGS

Further advantages and embodiments are evident from the accompanying drawings. In the drawings.

DETAILED DESCRIPTION OF EMBODIMENTS

Figure 1:
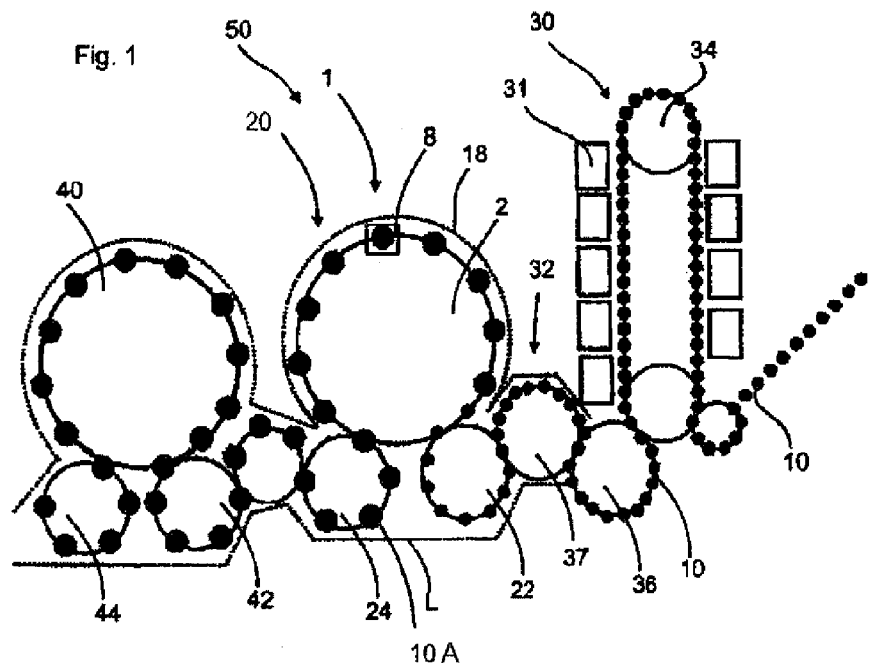
FIG. 1 shows schematically a view of a plant for producing plastic containers with a blow station of a stretch blow moulding machine arranged in a clean room for carrying out the method according to the inventive concepts comprising a stretching rod element with a sealing lip element disposed at the end of its hollow rod body facing the plastic preform for pneumatic sealing with respect to the plastic preform.

Exemplary embodiments in accordance with principles of inventive concepts will now be described more fully with reference to the accompanying drawings, in which exemplary embodiments are shown. Exemplary embodiments in accordance with principles of inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. Like reference numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Exemplary embodiments in accordance with principles of inventive concepts are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments in accordance with principles of inventive concepts should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments in accordance with principles of inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 shows a schematic representation of a system 50 for producing containers 10A. The containers 10A are preferably plastic containers, but not limited thereto. This system 50 has a heater 30 in which plastic preforms 10 are heated. The plastic preforms 10 are led through this heater 30 by means of a transport device 34, such as in this case a circulating chain, and in this case is heated by a plurality of heating elements 31. A transfer unit 36 transfers the plastic preforms 10 to a sterilizing unit 32. The transfer unit 36 can adjoin the heater 30. The sterilizing unit 32 has a transport wheel 37. Sterilizing elements can be disposed on this transport wheel 37 or also or alternative in a stationary manner. In this region, sterilization is possible, for example, by hydrogen peroxide gas or by electromagnetic or respectively UV radiation or related form of sterilization. An internal sterilization of the plastic preforms can be carried out in this region.

A clean room 20 is illustrated of which the outer boundaries are indicated here by dashed line L. In a further preferred embodiment the clean room 20 is not only disposed in the region of the transport wheel 2 and the filling unit 40, but may already begin in the region of the heater 30, the sterilizing unit 32, the delivery of plastic preforms and/or the production of plastic preforms. It will be recognised that the clean room 20 begins in the region of the sterilizing unit 32. In this region, an air lock or the like can be provided in order to introduce the plastic preforms 10 into the clean room 20 without too much gas flowing out of the clean room 20 and so being lost.

As indicated by the dashed line L, the clean room 20 is adapted to or otherwise conforms to an external shape of individual system components. In this way, the volume, area, or other dimensions of the clean room 20 can be reduced.

A stretch blow moulding machine 1 is illustrated in which a plurality of blow stations 8 is disposed on a transport wheel 2. Only one of these blow stations 8 is illustrated in FIG. 1. The blow stations 8 permit the plastic preforms 10 to be expanded to form containers 10A. Although not shown in detail here, the entire region of the transport device 2 is not located within the clean room 20. The clean room 20 or respectively isolator can be to a certain extent provided as a mini-isolator within the entire stretch blow moulding machine 1. Thus, it is possible for the clean room 20 to be of a channel-like construction at least in the region of the stretch blow moulding machine 1.

A delivery unit 22 transfers the plastic preforms to the stretch blow moulding machine 1 and a discharge unit 24 discharges the produced plastic containers 10A from the stretch blow moulding machine 1. The region of the delivery unit 22 and the discharge unit 24 in the clean room 20 has recesses in each case which contain these units 22, 24. In this manner, a transfer of the plastic preforms 10 to the stretch blow moulding machine 1 or respectively a take-up of the plastic containers 10A from the stretch blow moulding machine 1 can be achieved in a particularly advantageous manner.

The expanded containers 10A are transferred to a filling unit 40 by a transfer unit 42. From the filling unit 40, the containers 10A are discharged via a further transport unit 44. The filling unit 40 is also located at the clean room 20. In other embodiments, the entire filling unit 40 with, for example a reservoir for a drink, is not required to be disposed completely within the clean room 20. Here, too, but can provide for only those regions through which the plastic containers 10A actually pass. The filling unit 40 can be constructed in a similar way as the stretch blow moulding machine 1 for transforming the plastic preforms 10.

As described above, in the region of the stretch blow moulding machine 1, the clean room 20 can be reduced to the smallest possible region, namely, a region providing for the blow stations 8. Due to this compact configuration of the clean room 20 it is possible to actually produce a clean room 20 more easily and quickly, and also keeping it sterile in the operating phase is less complex. Also less sterile air is required, which leads to smaller filter systems and also the risk of caused uncontrolled turbulence is reduced.

Furthermore, a supply unit which is not shown in greater detail can be provided. The supply unit serves for supplying in particular the blow stations with the flowable sterilizing medium. This supply unit 60 can be located on the transport wheel 2 or on the stationary wall 18 or generally stationary and can have nozzles or the like. It may also be advantageous for sterile air for sterilizing the clean room 20 to be introduced into the clean room 20 via the ventilation system. Alternatively or additionally, however, the supply unit could also be a device which supplies the blow stations 8 with (in particular electromagnetic) radiation, e.g. UV or electron radiation. In an assembled state of the components, at least one region of the sealing means can be reached by this electromagnetic radiation.

Figure 2:
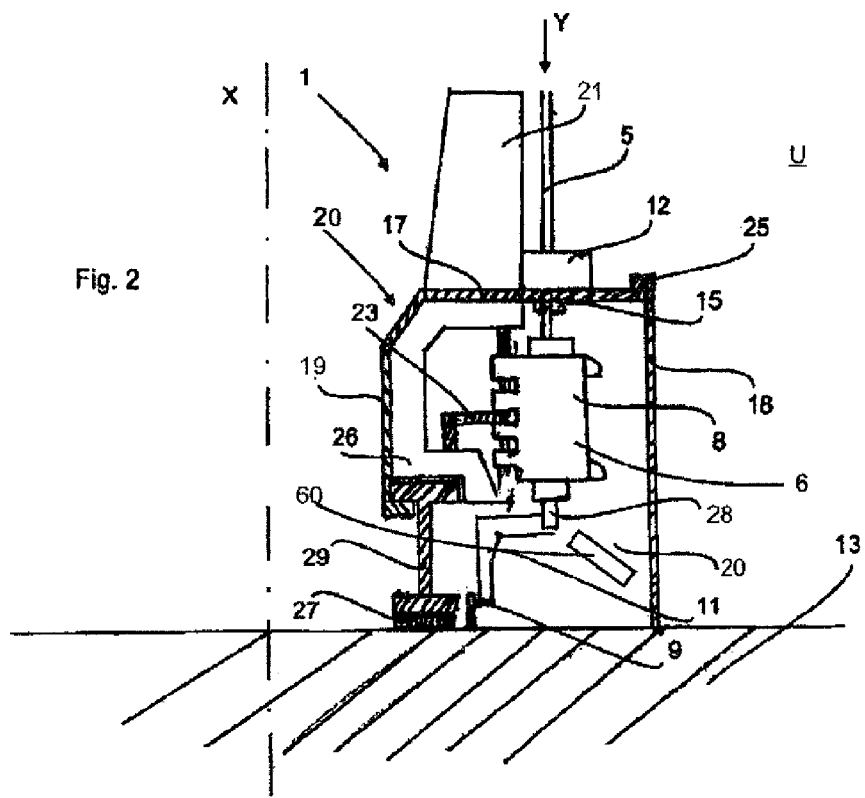
FIG. 2 shows schematically a detail view the blow station of the stretch blow moulding machine of FIG. 1.

FIG. 2 shows a detailed view of the stretch blow moulding machine 1 in the region of a blow station 8. FIG. 2 also illustrates a surrounding U of the clean room 20, which may include an unsterile surrounding. A plurality of such blow stations 8 can move rotatably about an axis X by a transport device 2, or carrier 2. As can be seen in FIG. 2, the blow station 8 is guided within the clean room 20, which in this case is of channel-like design. The clean room 20 is closed off by a movable side wall 19 and a cover 17 formed integrally with this side wall 19. In this case the side wall 19 and the cover 17 rotate with the blow station 8.

A wall 18 can also be provided. The wall 18 can be a stationary external wall. Between the cover 17 and the wall 18 there is provided a sealing device 25 by which the elements 17 and 18 which are movable with respect to one another are sealed against one another, for example using a water lock, as mentioned above. The lower region of the wall 18 is disposed so as to be fixed and to form a seal on a base 13. A carrier 26, which is also moved rotatably and on which a holding unit 23 which holds the blow station 8 is provided, is provided within the clean room 20 where it bears directly against the wall 19.

A follower device 11 can be provided which can be actuated by a guide curve 9 in order to open and close the blow station 8 on its way through the clean room 20 in order in particular to introduce the plastic preform 10 into the blow station 8 and also to remove it again. In this case a guide curve 9 is also disposed within the clean room 20. However it would also be possible for example for a portion 28 to extend below the individual blow station 8 out of the clean room 20.

The carrier 26 is fixed on a holding member 29. The holding member 29 is in turn movable with respect to the base 13. A sealing device 27 can be provided which in the region also produces a seal between regions 13 and 29 which are movable with respect to one another.

A stretching rod element 5 is movable with respect to the blow station 8 in order to stretch the plastic preforms 10 in their longitudinal direction, for example, from a first configuration to a second configuration. In this case a carriage 12 is disposed on the cover 17 and the stretching rod element 5 is movable in the stretching direction Y relative thereto. Another holder 21 can be provided for the carriage 12 of the stretching rod element 5.

It will be recognised that during the blow moulding process certain regions of the stretching rod element 5 are disposed both outside the clean room 20 and inside the clean room 20. For this purpose it is possible to provide outside the clean room 20 or respectively above the carriage 12 a protective device such as a pleated bellows which surrounds the stretching rod element 5 so that no region of the stretching rod element 5 comes into direct contact with the external environment. However, the clean room is not absolutely necessary for the present inventive concepts, or respectively the inventive concepts can also be used in non-aseptic machines.

The individual blow stations 8 each have blow mould supports 6, inside which blow moulds 8A (see FIG. 4) are disposed. As known in the prior art, these blow mould supports 6 can have two blow mould support parts which are pivotable relative to one another by means of a common pivot shaft 3 for opening and closing the blow mould 8A.

Figure 3:
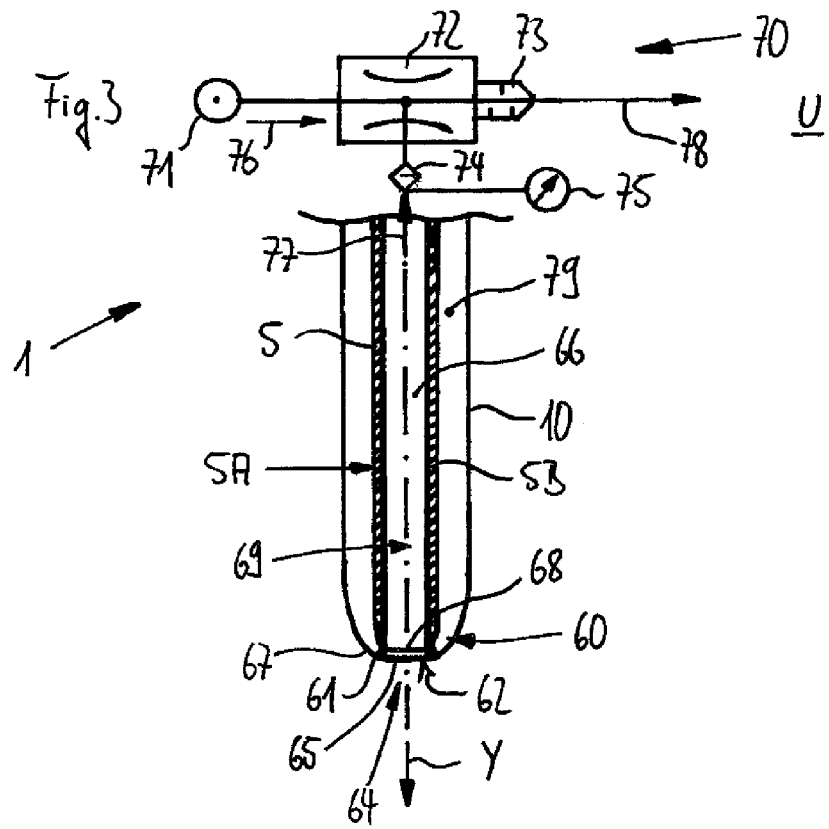
FIG. 3 shows schematically a view of the method of stretch blow moulding which can be carried out by the stretch blow moulding machine of FIGS. 1 and 2.

According to the representation in FIG. 3, the stretching rod element 5 with its hollow rod body 5A is already introduced into the plastic preform 10 in the stretching direction Y in such a way that on its hollow rod body end 60 facing the plastic preform 10 the stretching rod element 5 bears with a sealing lip element 61 on the tip region 62 of the plastic preform 10 in a sealing manner. The tip region 62 incorporates a material region 64 of the plastic preform 10 which lies opposite the mouthpiece region 63 (see FIG. 4) of the plastic preform 10 and which in turn forms a material region 65 of the plastic preform 10 drawn in by the stretching rod element 5. For example, the material region 65 can be pulled toward an interior of the perform (10) in a direction toward the mouthpiece 63.

While the plastic preform 10 is being drawn in by a vacuum 66 generated inside the stretching rod element 5, the material region 65 drawn in by the stretching rod element 5 and adjacent material regions 67 are stretched by the introduction of compressed air in a shaping process in the sense of the inventive concepts which is otherwise known per se. The position of the stretching rod can be adjusted in any way time period for expansion which can be chosen freely. At the time of the introduction of the compressed air the stretching rod preferably initially remains in its original position in which its sealing element rests in a sealing manner on the inner face of the preform tip. Which material regions 64 or respectively 65 and/or 67 in this case are more or less considerably stretched is also set in particular by the respective temperature regulation of these material regions 64 or respectively 65, 66. As soon as the preset material stretching in the preform has been reached, the position of the stretching rod can be changed automatically. In particular by the use of electrical stretching a precise time control of the stretching rod position is possible. However, the stretching rod position can alternatively be controlled pneumatically. In this case it is in particular possible, depending upon preform geometry, that is to say also depending upon material thickness in the base, to set how much material or respectively how long the stretching rod must draw in the tip, so that optimal material stretching in the base can be achieved. Thus, in particular the time period during the expansion process, during which the preform tip is drawn in, is changed. Also, the time window during which such drawing in takes place can be shifted with respect to the expansion process.

The material thicknesses for each preform geometry can be stored centrally in the control so that accordingly the expansion processes can also be controlled as a function of the individual configuration and, depending upon the type of preform, the time for drawing in and/or holding the stretching rod in a certain position or respectively also a time progression of the stretching rod (or the moving thereof) can be set automatically. Thus, it would be conceivable that the drawing in of the preform could be started during a standstill of the stretching rod or also during a movement of the stretching rod. Also, the drawing in of the preform can be interrupted during a movement of the stretching rod or during a standstill of the stretching rod.

The sealing lip element 61 is disposed concentrically about an intake opening 68 of a negative pressure region 69, in order to seal this negative pressure region 69 on the plastic preform 10 with respect to blow pressure regions.

In order to generate the vacuum 66 within the stretching rod element 5 the stretch blow moulding machine 1 is also equipped with a vacuum generating device 70, shown by way of example in FIG. 3. This vacuum generating device 70 is characterised in this embodiment by an air displacer 71, a throttle 72, a sound absorber 73 as well as a filter element 74 and a vacuum manometer 75. The volume of air 76 conveyed by the air displacer 71 is accelerated by means of the throttle 72. A volume of air 77 can be extracted from the stretching rod element 5 and the vacuum 66 is generated. The volume of air 76 and the other volume of air 77 are discharged as a total volume of air 78 through the sound absorber 73 into the surroundings U. However, the vacuum could also be generated by a further rod-shaped member, wherein the preform can then be stretched by a stretching rod.

The blowing pressure is introduced in a known manner by means of a nozzle element (not shown in detail herein) into a cavity 79 of the plastic preform 10.

Alternatively the stretching rod element 5 can also have in addition to the negative pressure region 69 an overpressure region (not shown) for providing a blow pressure within the cavity 79 of the plastic preform 10, wherein the negative pressure region 69 is pneumatically separated from this overpressure region. In this embodiment the overpressure region is formed by air ducts (not shown) in the wall 5B of the stretching rod element 5 which open into the cavity 79 of the plastic preform 10 in order to be able to inject blow air through this into the cavity 79 for expanding the plastic preform 10.

Figure 4:
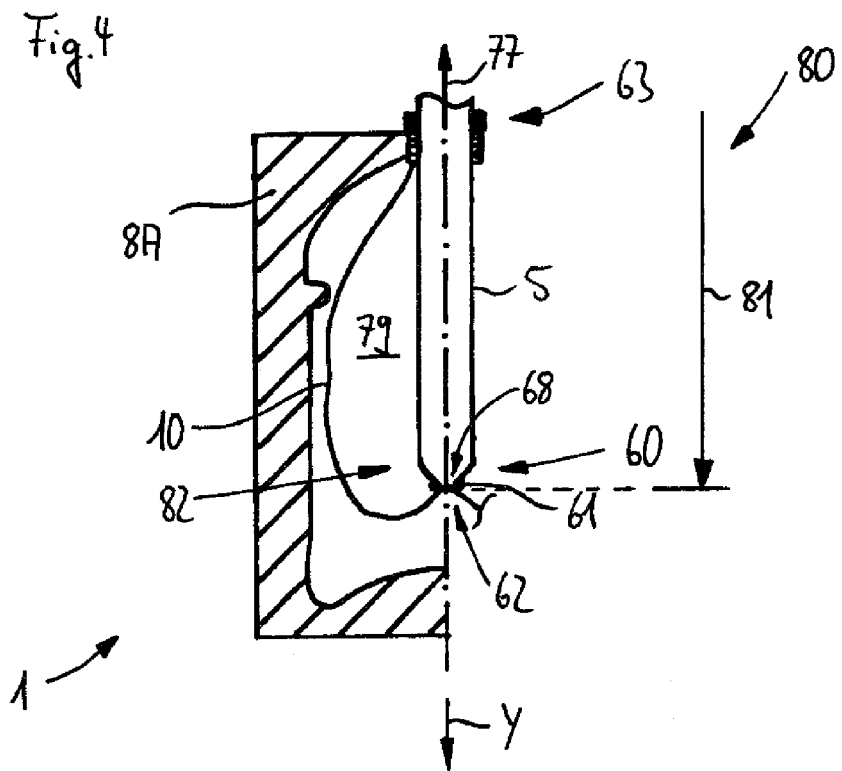
FIG. 4 shows schematically a cut-away partial view of a blow mould with a plastic preform already partially expanded therein, which is vacuum-fixed on its tip region to the stretching rod element.

According to the illustration in FIG. 4, the plastic preform 10 can be in an advanced expansion phase 80 on approximately half the shaping path to a container 10A. The stretching rod element 5 can be moved in the stretching direction Y by a displacement path 81 into a holding position 82 and the plastic preform 10 can be drawn in at least in some regions by the stretching rod element 5 and to the stretching rod element 5 in order to influence the expansion behavior of the plastic preform 10 or respectively the stretching behavior of the material of the plastic preform 10, for example, a reaction of the plastic perform 10 during expansion, stretching, or other change in configuration.

At the blow mould 8A, the partially-expanded plastic preform 10 can be easily recognised as it is fixed with its tip region 62 by suction on the stretching rod element 5 in spite of the advancing blowing process. In this respect the expansion of the plastic preform 10 proceeds in spite of the drawing in of the plastic preforms 10 on the stretching rod element 5, and in particular the material regions 66 immediately adjacent to the drawn in material region 65 are advantageously stretched, so that no unfavourable accumulations of material remain on the base region of the subsequently produced containers 10A. In this case the plastic preform 10 passes the stretching rod element 5 axially in the stretching direction Y.

The blow moulding process may take place in a plurality of steps. A preliminary blowing of the plastic preform can take place, then an intermediate blowing at which the pressure of the plastic preform is elevated. Then a final blowing can occur, during which a pressure within the plastic preform is preferably substantially retained in order to shape it within its blow mould. A final blow moulding pressure can move for example in a range from 25 bars to 50 bars, preferably in a range from 35 bars to 50 bars and preferably a range from 35 bars to 45 bars. The drawing in of the plastic preform or respectively preform can preferably begin at the latest at a time when it could be released from the stretching rod due to the blowing pressure.

It will be understood that embodiments explained herein are merely examples of a method of stretch blow moulding according to the inventive concepts. In this respect the disclosure of the inventive concepts is not limited to this embodiment.

The applicant reserves the right to claim all the features disclosed in the application documents as being essential to the inventive concepts in so far as they are individually or in combination novel over the prior art.

What is claimed is:

1. A method of forming a container, comprising:
   expanding a preform to a first configuration in a blow mould of a stretch blow moulding machine;
   introducing a stretching rod element to the blow mould to stretch and expand the preform from the first configuration to a second configuration; and
   moving the stretching rod element axially in the blow mould in a stretching direction, wherein the plastic preform is temporarily coupled to the stretching rod element during at least a period of time of the expansion of the preform from the first configuration to the second configuration for influencing a behavior of the preform during the expansion, and wherein a tip region of a material region of the preform opposite a mouthpiece region of the preform is drawn by the stretching rod element during the stretching of the preform, wherein the stretching rod element comprises a hollow rod body, and wherein the tip region of the preform is drawn by a vacuum in the hollow rod body of the stretching rod element during stretching of the preform.

2. The method of claim 1, wherein during the drawing of the preform by the stretching rod element, at least one of a material region drawn by the stretching rod element or adjacent material regions are stretched.

3. The method of claim 2, wherein the at least one of the material region drawn by the stretching rod element or adjacent material regions are expanded further axially in the stretching direction in response to the preform being temporarily coupled to the stretching rod element by a vacuum.

4. The method of claim 1, further comprising:
   moving the stretching rod element along a displacement path in the stretching direction to a holding position;
   temporarily positioning the stretching rod element in the holding position for a predetermined time period; and
   in the holding position, expanding the preform at least one of axially or radially.

5. The method of claim 1, wherein a time during which the preform is set differently then a stretch blow moulding time.

6. The method of claim 1, further comprising simultaneously providing a blow pressure for expanding the preform and a negative pressure for drawing on the preform.

7. The method of claim 1, wherein the preform comprises a plastic material.

8. The method of claim 1, wherein the material region of the preform opposite the mouthpiece region of the preform forms a material region of the preform that is drawn in a direction of the mouthpiece by the stretching rod element.

9. The method of claim 1, wherein moving the stretching rod element axially in the blow mould in the stretching direction comprises positioning an end of the hollow rod body to face the preform, and positioning a sealing lip element on the tip region of the preform to seal the stretching rod element with respect to the preform.

10. A stretch blow moulding machine, comprising:
   at least one blow station comprising a blow mould and a stretching rod element for stretching a preform in a stretching direction; and
   a vacuum generating device that generates a vacuum in a hollow interior of the stretching rod element during a stretching operation of a stretch blow moulding operation performed on the preform to form a container.

11. The stretch blow moulding machine of claim 10, wherein the stretching rod element includes a hollow rod body and a sealing lip element at the end of the hollow rod body, the sealing lip element positioned to pneumatic seal the stretching rod element with respect to the preform.

* * * * *